(12) United States Patent
Oh (10) Patent No.: US 9,139,067 B2
(45) Date of Patent: Sep. 22, 2015

(54) AIR CONDITIONER OF ELECTRIC VEHICLE

(75) Inventor: Man Ju Oh, Ulsan (KR)

(73) Assignees: HYUNDAI MOTOR COMPANY, Seoul (KR); KIA MOTORS CORPORATION, Seoul (KR)

(*) Notice: Subject to any disclaimer, the term of this patent is extended or adjusted under 35 U.S.C. 154(b) by 659 days.

(21) Appl. No.: 13/198,239

(22) Filed: Aug. 4, 2011

(65) Prior Publication Data

US 2012/0102973 A1     May 3, 2012

(30) Foreign Application Priority Data

Nov. 1, 2010    (KR) ................. 10-2010-0107810

(51) Int. Cl.
*F25B 21/02*    (2006.01)
*B60H 1/00*    (2006.01)

(52) U.S. Cl.
CPC ........ *B60H 1/00478* (2013.01); *B60H 1/00028* (2013.01)

(58) Field of Classification Search
CPC .................. B60H 1/00478; B60H 1/00028
USPC .................................... 62/3.3, 3.61
See application file for complete search history.

(56) References Cited

U.S. PATENT DOCUMENTS 3,355,900 A * 12/1967 De Castelet .................. 62/3.61
6,213,198 B1 * 4/2001 Shikata et al. ................ 165/202
6,949,021 B2 * 9/2005 Ichishi et al. .................. 454/75

FOREIGN PATENT DOCUMENTS

| FR | 2598493 A1 * | 11/1987 | .............. B60H 1/00 |
| JP | 9-254630 A | 9/1997 | |
| JP | 2000-146220 A | 5/2000 | |
| JP | 2003-320843 A | 11/2003 | |
| JP | 2008-94366 A | 4/2008 | |

* cited by examiner

*Primary Examiner* — Emmanuel Duke
(74) *Attorney, Agent, or Firm* — Morgan, Lewis & Bockius LLP (57) ABSTRACT

An air conditioner of an electric vehicle includes a blower. A Peltier unit is connected to the blower unit to receive air blown therefrom, and includes Peltier devices mounted on opposite side sections. One surface of each Peltier device is oriented inward and the other surface of each Peltier device is oriented outward in order to eject cooled or heated air to respective regions. A partition is mounted between the opposite side sections of the Peltier unit to divide a space inside the Peltier unit into first and second spaces, the Peltier device mounted on one side section is contained in the first space, and the Peltier device mounted on the other side section is contained in the second space. A guide case contains the Peltier unit therein and introduces outside air. Heat exchange occurs when the air sequentially passes through the first and second spaces of the Peltier unit.

7 Claims, 6 Drawing Sheets

AIR CONDITIONER OF ELECTRIC VEHICLE

CROSS REFERENCE TO RELATED APPLICATION

The present application claims priority to Korean Patent Application Number 10-2010-0107810 filed on Nov. 1, 2010, the entire contents of which application is incorporated herein for all purposes by this reference.

BACKGROUND OF INVENTION

1. Field of Invention

The present invention relates to an air conditioner of an electric vehicle, and more particularly, to an air conditioner of an electric vehicle in which a Peltier unit having a Peltier device is provided and an air guide passage is improved in order to increase the efficiency of cooling and heating.

2. Description of Related Art

In general, an air conditioner, also known as a Heating, Ventilation, and Air Conditioning (HVAC) system, is installed in a vehicle in order to provide a pleasant environment to a driver and passengers by performing a variety of air-conditioning functions, such as ventilation, cooling, and heating, in a cabin in response to an operation by a driver. Such an HVAC system can be operated by the driver or the passenger using controls provided to the lower right of a steering wheel. The HVAC system can also be operated by adjusting a ventilation passage or running an air conditioner compressor by operating an automatic temperature control unit.

Figure 1:
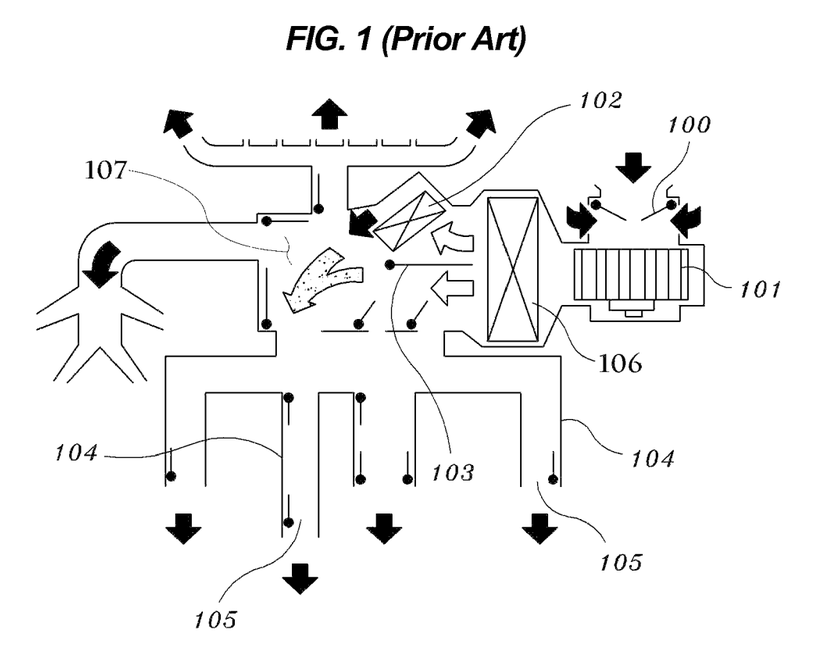
FIG. 1 is a status view schematically showing an air conditioner for a vehicle of the related art.

FIG. 1 is a status view schematically showing an air conditioner for a vehicle of the related art. In the air conditioner for a vehicle of the related art shown in the figure, the ventilation passage of air that passes through an air conditioner evaporator is described as follows. An air inlet door 100 determines whether inside air or outside air is the source of air to be blown. A blower 101 is configured to forcibly blow the air into a cabin of the vehicle through the air inlet door 100. The air conditioner evaporator 106 is provided such that the air that is introduced from the blower 101 passes through it. An air mix door 103 is configured such that it regulates the amount of the air that is blown toward a heater core 102. Air ducts 104 and air vents 105 are configured to supply the air that has passed through the air conditioner evaporator 106 and the heater core 102 to individual regions of the vehicle.

Describing in greater detail the flow of the air that is supplied into the cabin of the vehicle through the ventilation passage as above, the blower 101 takes in the air from the source of air, which is selected by the air inlet door 100, and forcibly blows the air, so that the blown air is cooled while passing through the evaporator 106 of the air conditioner before being introduced into the cabin of the vehicle.

After having passed through the evaporator 106 of the air conditioner, the air is introduced into the cabin of the vehicle through the air ducts 104 and the air vents 105, after selectively having passed through the heater core 102 depending on the state of the air mix door 103. The air that has passed through the heater core 102 and the air that has not passed through the heater core 102 are mixed in a mix zone 107 so that the mixed air is converted to a predetermined temperature. Afterwards, the resultant air is introduced into the cabin of the vehicle through the air ducts 104 and the air vents 105.

Therefore, when the amount of air that passes through the heater core 102 increases, the temperature of the air supplied into the cabin of the vehicle rises correspondingly. As described above, the air mix door 103 substantially serves to control the temperature of the air that is introduced into the cabin of the vehicle.

Of course, it is possible to supply air having a predetermined temperature into the cabin of the vehicle or regulate the supply of the air by controlling the degree to which the air vents are opened/closed and the degree to which the air conditioner compressor is operated while regulating the basic passageways of the air. The air vents 105 are generally configured to blow the air in three directions, that is, toward the feet, the chest, and the head of the driver or the passenger.

The air conditioner for a vehicle of the related art, which is configured to control the temperature of the cabin of the vehicle, actuates a cooler or a heater to cool or heat the cabin of the vehicle when controls provided on a portion of a dashboard that is to the lower right of a steering wheel, are operated.

In such a combined air conditioner for a vehicle, engine coolant of the heater for a vehicle is heated, and the air taken in by the blower 101 obtains heat necessary for heating while passing through the heater core 102, which is provided in a coolant circulation path.

However, in the case in which the air conditioner of a vehicle of the related art is intended to be applied to an electric vehicle, which does not need engine coolant, it is difficult to perform heating with the existing HVAC structure. There are also problems in that it is difficult to install the heater core 102 and in that the ability to miniaturize the system is limited since the evaporator and the heater core are provided internally.

The information disclosed in this Background of the Invention section is only for the enhancement of understanding of the background of the invention and should not be taken as an acknowledgment or any form of suggestion that this information forms the prior art that would already be known to a person skilled in the art.

The information disclosed in this Background section is only for enhancement of understanding of the general background of the invention and should not be taken as an acknowledgement or any form of suggestion that this information forms the prior art already known to a person skilled in the art.

SUMMARY OF INVENTION

Various aspects of the present invention provide an air conditioner of an electric vehicle, which can be applied to an electric vehicle and can be miniaturized.

Also provided is an air conditioner of an electric vehicle, which uses a Peltier unit without restricting the refrigerant to Freon gas, the use of which is regulated, and which has a light and simple structure.

Also provided is an air conditioner of an electric vehicle, which has a structure that enables double heat exchange inside the Peltier unit, thereby improving the efficiency of cooling and heating.

In an aspect of the present invention, the air conditioner of an electric vehicle includes a blower, which contains a blower therein in order to forcibly blow intake air. A Peltier unit is connected to the blower unit to receive air that is blown from the blower unit, and includes Peltier devices mounted on opposite side sections in the outer circumference thereof, with one surface of each of the Peltier devices being oriented inward and the other surface of each of the Peltier devices being oriented outward, in order to eject air that is cooled or heated to respective regions of the vehicle. A partition is mounted between the opposite side sections of the Peltier unit to divide a space inside the Peltier unit into first and second spaces, the Peltier device mounted on one side section being contained in the first space, and the Peltier device mounted on the other side section being contained in the second space. A guide case contains the Peltier unit therein and introduces outside air in order to dissipate heat to the outside, the heat being generated from the other surface of each of the Peltier devices. Heat exchange occurs when the air that is blown from the blower unit sequentially passes through the first and second spaces of the Peltier unit.

In various aspects of the present invention, the Peltier unit may include an upper section defining an inlet for allowing the blower unit to communicate with the first space and an entrance communicating with the second space. The entrance communicates with an air vent, which guides air that has passed through heat exchange to respective regions of the vehicle. The Peltier unit may also include the opposite side sections of four side sections, which adjoin the upper section, the Peltier devices being mounted on the opposite side sections.

In other aspects of the invention, the Peltier unit may include heat exchanger fins mounted on one surface of each of the Peltier devices such that heat transfer is enabled, and heat dissipation fins mounted on the other surface of each of the Peltier devices such that heat transfer is enabled.

In other aspects of the invention, the air vent may include a first air vent guiding the cooled or heat air to be ejected toward a windshield of the vehicle, and a second air vent guiding the cooled or heat air to be ejected toward a chest of a driver or a passenger.

In various aspects of the invention, the Peltier unit may further include a lower section opposite the upper section. The lower section communicates with a third air vent, which guides the cooled or heated air toward feet of the driver or the passenger.

Other aspects of the invention, a first damper is provided in the entrance of the first air vent, a second damper is provided in the entrance of the second air vent, and a third damper is provided in the entrance of the third air vent.

In various aspects of the invention, the partition may include a partition damper mounted on one end thereof, which faces the upper section, the partition damper selectively allowing the first space and the second space to communicate with each other, and a communication port formed on the other end thereof, the communication port allowing the first space and the second space to communicate with each other.

In various aspects of the invention, the guide case may have an exhaust inlet passage. One end of the exhaust inlet passage contains therein an exhaust blower in order to take in air from an outside, and the other end of the exhaust inlet passage is connected to one of opposite side sections on which the Peltier devices are not mounted. The guide case may have an exhaust outlet passage. One end of the exhaust outlet passage is connected to the other side section opposite one side section to which the exhaust inlet passage is connected in order to exhaust air that has passed through heat exchange to the outside.

In another aspect of the invention, the exhaust blower may be located in an engine room side with respect to a dash panel, which separates a cabin of the vehicle from the engine from.

In various aspects of the invention, the blower may be located in an engine room side with respect to a dash panel, which separates a cabin of the vehicle from the engine from.

According to various aspects of the present invention, the air conditioner of an electric vehicle can selectively perform cooling and heating of the electric vehicle using the Peltier unit having the Peltier devices. In addition, double heat exchange can be realized by the improvement of the passage through which air flows, thereby increasing the efficiency of cooling and heating.

Furthermore, the air conditioner of an electric vehicle does not require a refrigerant system, such as the HVAC system, which is mounted on a vehicle having an internal combustion engine of the related art, and is provided with the Peltier unit, which can be reduced in size. Therefore, it is possible to reduce the weight and the manufacturing cost of the air conditioner.

In addition, the air conditioner of an electric vehicle does not use the refrigerant, such as Freon gas, which can cause environmental problem, and thus is free from the regulations that prohibit the use of Freon gas. Therefore, the air conditioner is environmental friendly and can be used without being regulated.

Moreover, it is possible to increase the outer circumferential area of the Peltier unit on which the Peltier devices are mounted, thereby increasing the heat transfer area and improving heat dissipation performance. Therefore, the air conditioner of an electric vehicle is applicable to medium size electric vehicles.

The methods and apparatuses of the present invention have other features and advantages which will be apparent from or are set forth in more detail in the accompanying drawings, which are incorporated herein, and the following Detailed Description of the Invention, which together serve to explain certain principles of the present invention.

The methods and apparatuses of the present invention have other features and advantages which will be apparent from or are set forth in more detail in the accompanying drawings, which are incorporated herein, and the following Detailed Description, which together serve to explain certain principles of the present invention.

BRIEF DESCRIPTION OF THE DRAWINGS

FIGS. 5 to 7 are state views showing the states in which cooled/heated air is ejected, in which

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Figure 2:
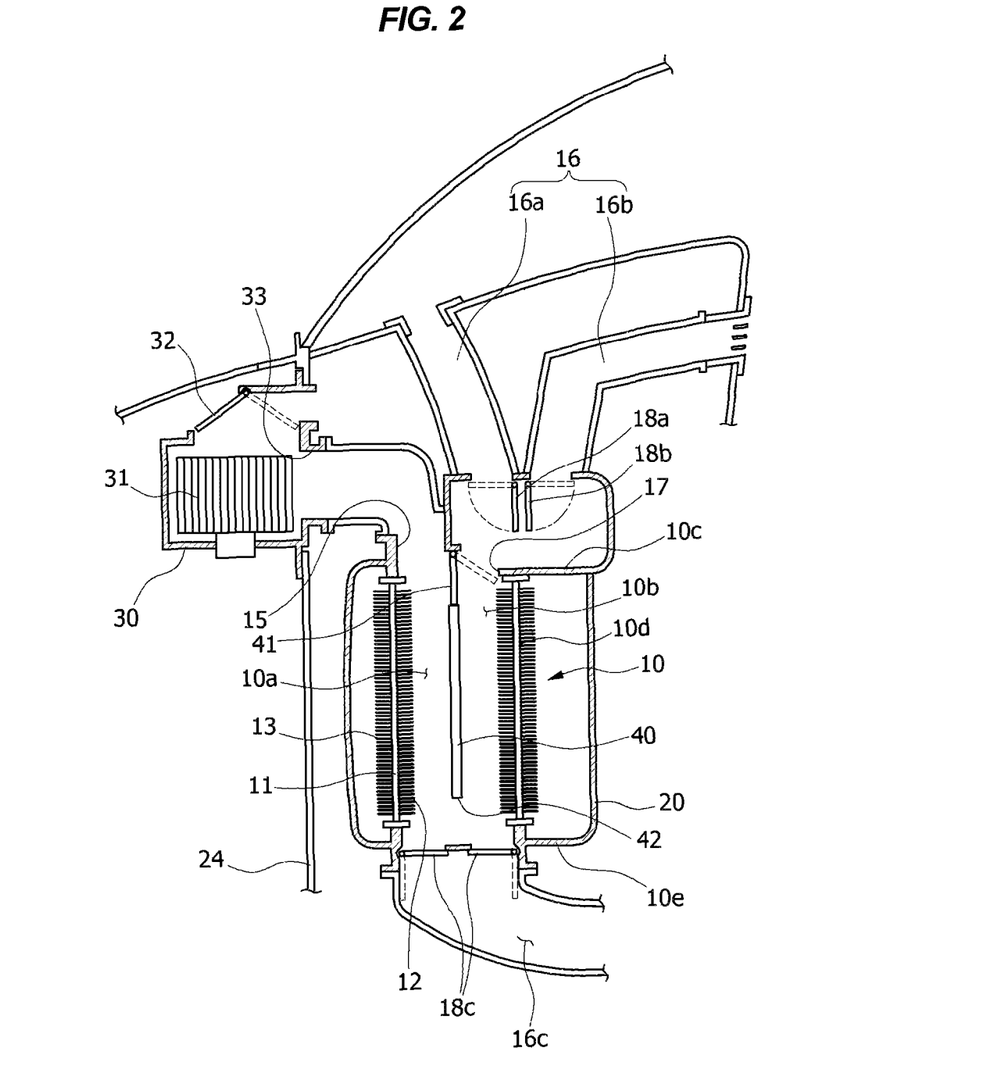
FIG. 2 is a front cross-sectional view showing an exemplary air conditioner of an electric vehicle according to the present invention.
Figure 3:
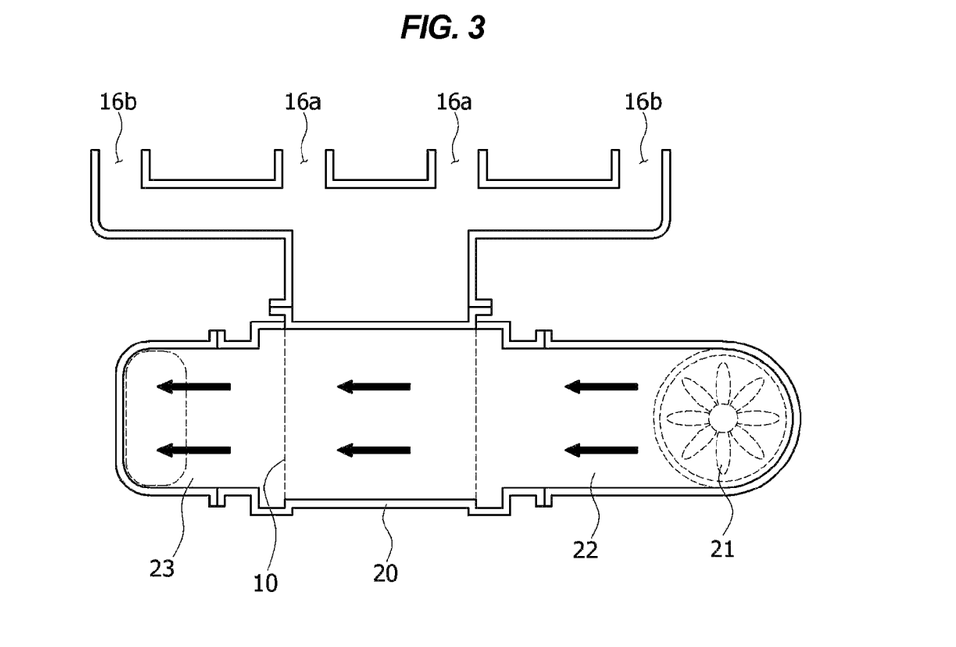
FIG. 3 is a top plan view showing an exemplary air conditioner of an electric vehicle according to the present invention.
Figure 4:
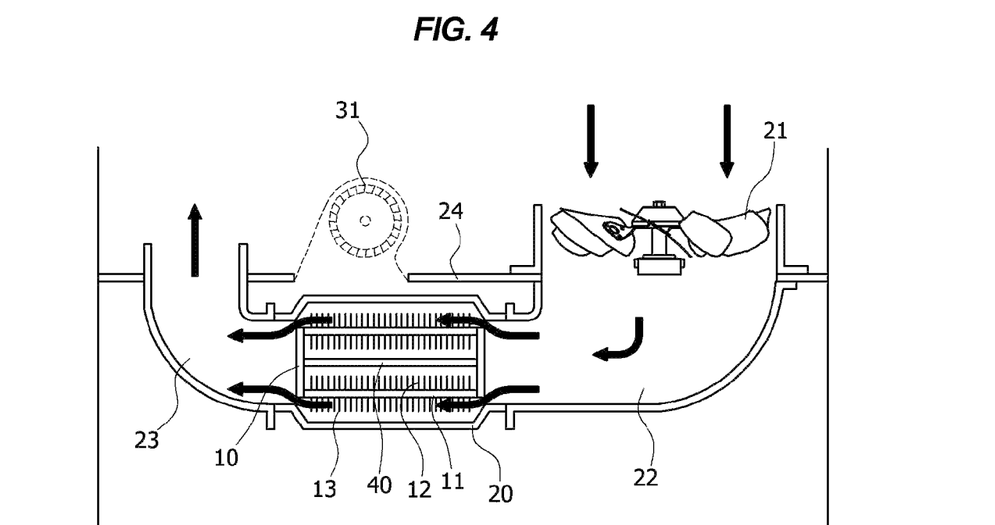
FIG. 4 is a side cross-sectional view showing an exemplary air conditioner of an electric vehicle according to the present invention.
Figure 5:
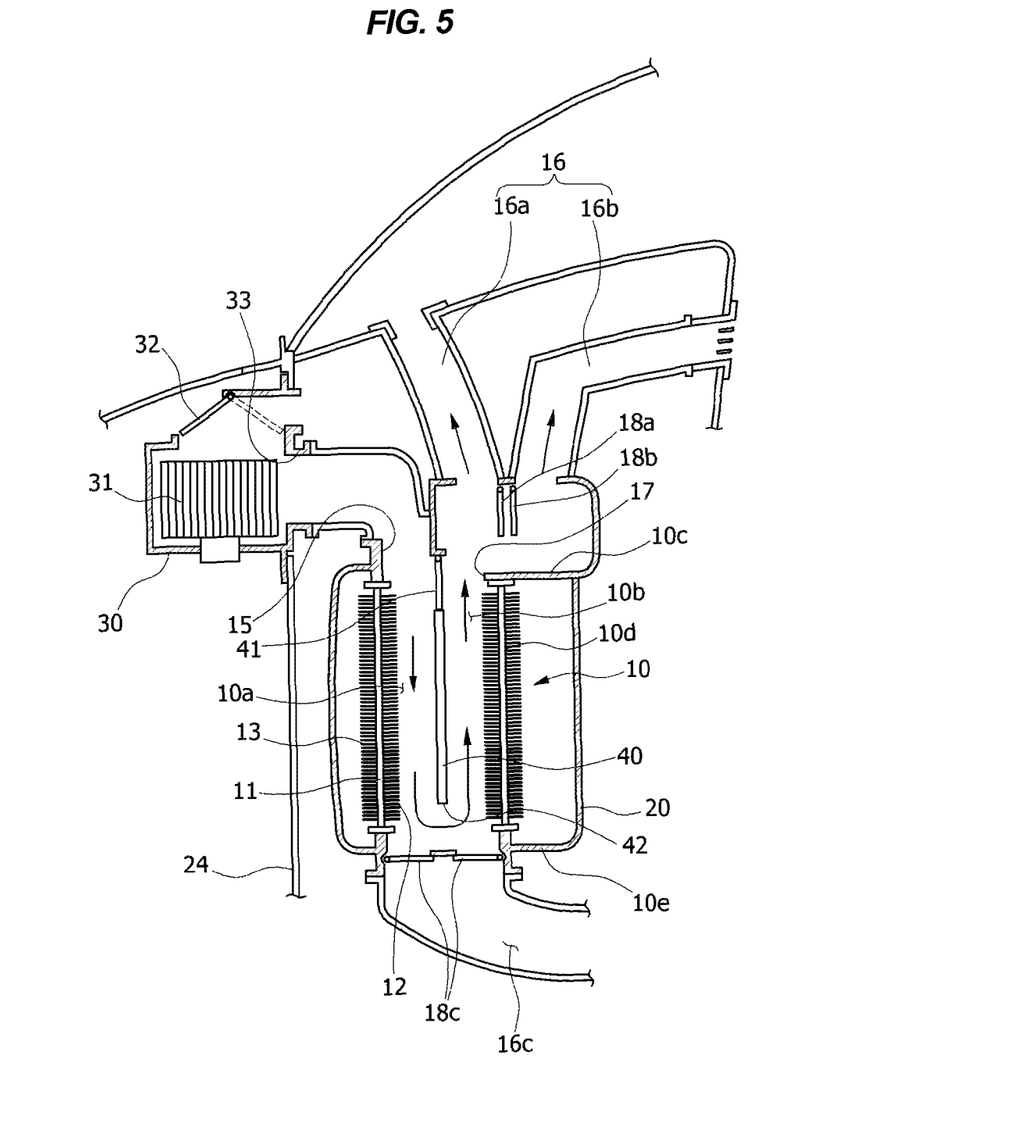
FIG. 5 is a view showing the state in which double heat exchange is enabled.
Figure 6:
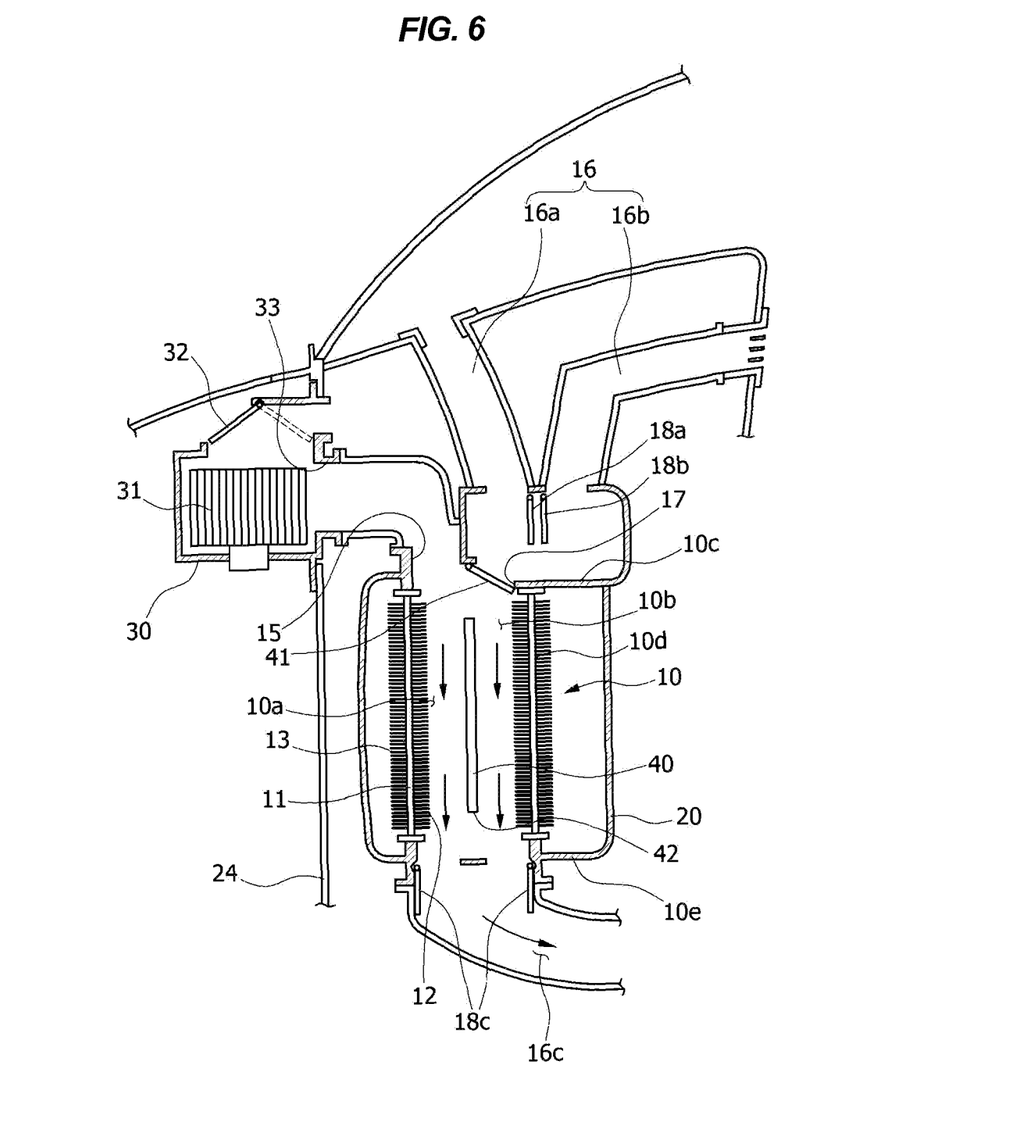
FIG. 6 is a view showing the state in which single heat exchange is enabled.
Figure 7:
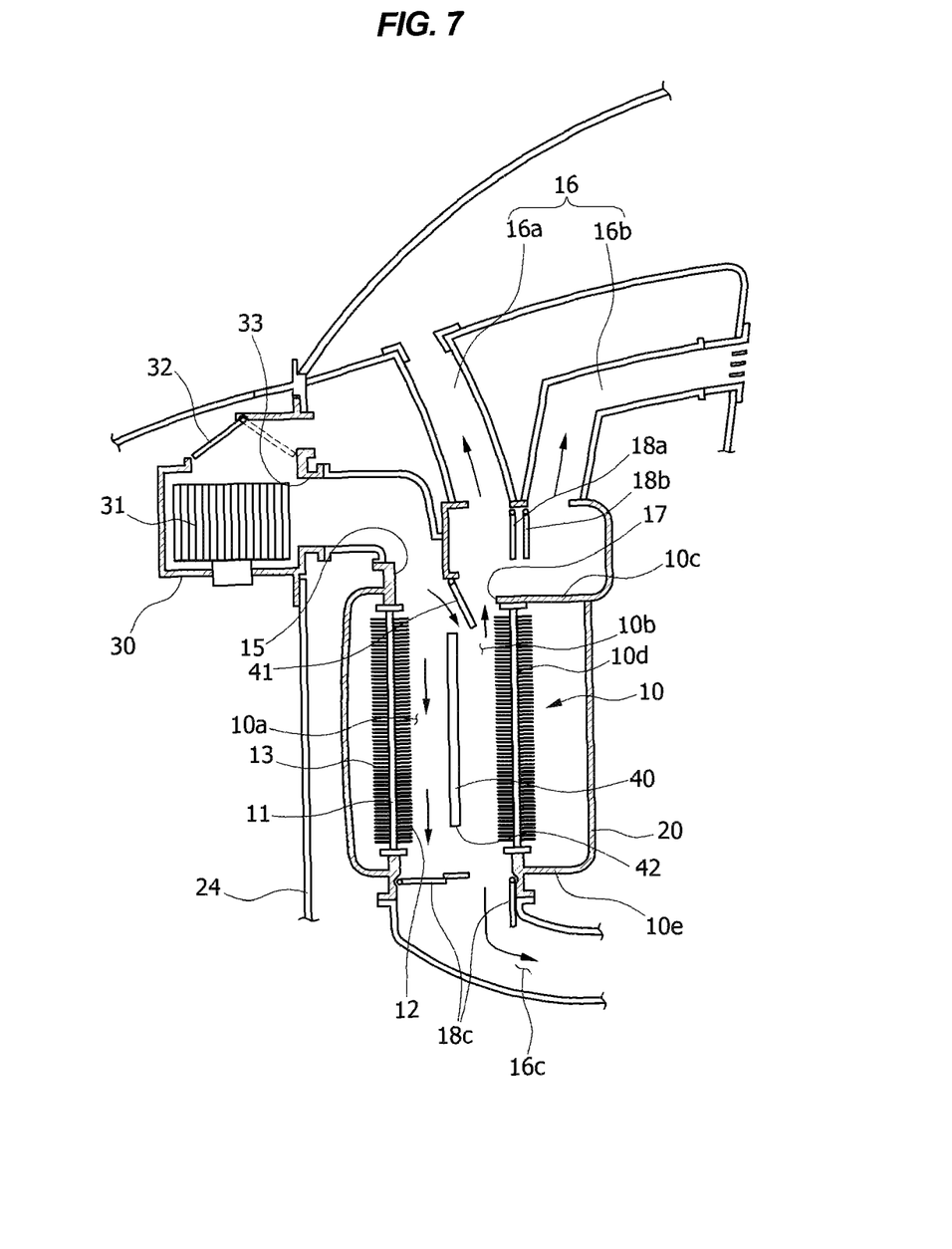
FIG. 7 is a view showing the state in which single and double heat exchange are both enabled.

FIG. 2 is a front cross-sectional view showing an air conditioner of an electric vehicle according to various embodiments of the invention, FIG. 3 is a top plan view showing the air conditioner of an electric vehicle according to various embodiments of the invention, and FIG. 4 is a side cross-sectional view showing the air conditioner of an electric vehicle according to various embodiments of the invention. FIGS. 5 to 7 are state views showing the states in which cooled/heated air is ejected, in which FIG. 5 is a view showing the state in which double heat exchange is enabled, FIG. 6 is a view showing the state in which single heat exchange is enabled, and FIG. 7 is a view showing the state in which single and double heat exchange are both enabled.

As shown in FIGS. 2 to 7, the air conditioner of an electric vehicle of various embodiments includes a blower unit 30, a Peltier unit 10, a partition 40, and a guide case 20. The blower unit 30 is provided therein with a blower 31 such that it can forcibly blow intake air. The Peltier unit 10 is connected to the blower unit 30 to receive part of the air that is blown from the blower 31, and is provided with Peltier devices 11 on the outer surface thereof. The partition 40 divides the space inside the Peltier unit 10 into a first space 10a and a second space 10b. The guide case 20 contains the Peltier unit 10 therein, and dissipates part of the heat of the Peltier unit 10 to the outside by introducing outside air.

The blower unit 30 includes the blower 31, which is disposed in the inner space thereof, and an air inlet door 32, which is disposed in the upper portion thereof. The air inlet door 32 serves to determine whether inside air or outside air will be the source of air to be blown. A ventilation hole 33, which communicates with the Peltier unit 10, is formed in the blower unit 30.

The Peltier unit 10 is configured as a hollow cubic structure, and a plurality of Peltier devices 11 is arranged on opposite side sections of the Peltier unit 10. Heat exchanger fins 12, which form a tube and fin type heat dissipation plate or a fin type heat dissipation plate, are mounted on one surface of the Peltier devices 11, which are in contact with the inside of the Peltier unit 10, such that heat can be efficiently transferred. Heat dissipation fins 13, which form a fin type heat dissipation plate, are mounted on the other surface of the Peltier devices 11, which are in contact with the outside of the Peltier unit 10, such that heat can be efficiently transferred. The other portions of the Peltier devices 11 are covered by an insulating material such that heat is not transferred, and the Peltier devices 11 are connected to a power supply.

In addition, in the Peltier unit 10, the upper section 10c has defined therein an inlet 15 and an entrance 17. The inlet 15 communicates with the ventilation hole 33 of the blower unit 30, and is in contact with the first space 10a. The entrance 17 communicates with the second space 10b, and serves to introduce air that has been subjected to heat exchange to respective regions of the vehicle. The Peltier devices 11 are mounted on the opposite side sections 10d of the four side sections, which are in contact with the upper surface 10c. The lower section 10e is opposite the upper section 10c, and communicates with a third air vent 16c, which introduces cooled/heated air so that the air is ejected toward the feet of a driver or a passenger.

In the air vent 16, a first air vent 16a serves to guide the cooled or heated air such that the air can be ejected toward the windshield of the vehicle, and a second air vent 16b serves to guide the cooled or heated air such that the air can be ejected toward the chest of the driver or passenger. A first damper 18a is mounted on the entrance of the first air vent 16a, a second damper 18b is mounted on the entrance of the second air vent 16b, and third dampers 18c are mounted on the entrance of the third air vent 16c.

A partition damper 41 is mounted on one end of the partition 40, which faces the upper section. The partition damper 41 selectively allows the first space 10a and the second space 10b to communicate with each other. A communication port 42 is provided on the other end of the partition 40, such that the first space 10a and the second space 10b communicate with each other.

The guide case 20 is provided in the form of a box that contains the Peltier unit 10 therein, and has defined an exhaust inlet passage 22 and an exhaust outlet passage 23. One end of the exhaust inlet passage 22 contains therein an exhaust blower 21, which takes in air from the outside, and the other end of the exhaust inlet passage 22 is connected to one of the opposite side sections on which the Peltier devices 11 are not mounted. One end of the exhaust outlet passage 23 is connected to the other side section opposite one side section to which the exhaust inlet passage 22 is connected, such that the exhaust outlet passage 23 exhausts the air that has passed through heat exchange to the outside. That is, the air taken in through the exhaust inlet passage 22 is subjected to heat exchange while traveling straight and is then directly discharged to the exhaust outlet passage 23 in the linear direction. In various embodiments, the exhaust blower 21 may be positioned adjacent to an engine room with respect to a dash panel 24, which divides the vehicle into the cabin and the engine room. The engine room of the vehicle refers to a space in which a motor or a battery, which actuates the vehicle, is disposed.

In various embodiments, the blower 31 may also be positioned adjacent to the engine room with respect to the dash panel 24.

Below, a detailed description will be given of a process in which the air conditioner of an electric vehicle of various embodiments operates.

In the case of intending to cool the cabin of the vehicle, the direction in which current flows through the Peltier devices 11 is controlled so that the inner surface of the Peltier devices 11 are converted into a low-temperature state and the outer surface of the Peltier devices 11 are converted into a high-temperature state. The inner surface in the low-temperature state absorbs heat from the heat exchanger fins 12, thereby converting the inner space of the Peltier unit 10 into a low-temperature state. High-temperature heat generated from the outer surface is transferred to the heat dissipation fins 13. The heat transferred to the heat dissipation fins 13 is forcibly blown by the exhaust blower 21, is subjected to heat exchange with air introduced through the exhaust inlet passage 22, and is then discharged to the outside through the exhaust outlet passage 23. In various embodiments, the heat exchanger fins 12 and the heat dissipation fins 13 may be arranged such that they intersect each other. That is, the heat exchanger fins 12 are arranged, preferably, in the vertical direction in order to facilitate the flow of air introduced in the vertical direction, and the heat dissipation fins 13 are arranged, preferably, in the horizontal direction in order to facilitate the flow of air introduced in the horizontal direction.

At the same time, as the blower 31 is operated, air that is forcibly blown is taken into the Peltier unit 10 through the inlet 15. The intake air is cooled through heat exchange while passing between the heat exchanger fins 12. The cooled air is then ejected to respective regions of the cabin of the vehicle through the air vent 16. Specifically, the cooled air is ejected toward the windshield, the chest of the driver or passenger, and the feet of the driver or the passenger in response to the operation of the first to third dampers 18a, 18b, and 18c, which are provided in respective entrances of the first to third air vents 16a, 16, and 16c. Thus, the cabin of the vehicle is cooled by ejecting the cooled air.

In the case of intending to heat the cabin of the vehicle, the direction in which current flows through the Peltier devices 11 is controlled to be opposite to the direction of current in the cooling, so that the inner surface of the Peltier devices 11 are converted into a high-temperature state and the outer surface of the Peltier devices 11 are converted into a low-temperature state. High-temperature heat in the inner surface is transferred to the heat exchanger fins 12, thereby converting the inside of the Peltier unit 10 into a high-temperature state. In addition, the low-temperature state of the outer surface absorbs heat from the heat dissipation fins 13, thereby creating cold air. The cold air created by the heat dissipation fins 13 is forcibly blown by the exhaust blower 21, is subjected to heat exchange with the air that is introduced through the exhaust inlet passage 22, and is then discharged to the outside through the exhaust outlet passage 23.

At the same time, as the blower 31 is operated, air that is forcibly blown passes through the ventilation hole 33 and is introduced into the Peltier unit 10 through the inlet. The intake air is converted into a high-temperature state through heat exchange while passing between the heat exchanger fins 12. The heated air is then ejected to respective regions of the cabin of the vehicle through the air vent 16. Specifically, the heated air is ejected toward the windshield, the chest of the driver or passenger, and the feet of the driver or the passenger in response to the operation of the first to third dampers 18a, 18b, and 18c, which are provided in respective entrances of the first to third air vents 16a, 16, and 16c. Thus, the cabin of the vehicle is heated by ejecting the heated air.

In the case in which the air conditioner of an electric vehicle, which performs cooling and heating as described above, is intended to perform double heat exchange, as shown in FIG. 5, when the blower 31 is operated in the state in which the partition damper 41 and the third dampers 18c are closed, intake air is subjected to first heat exchange with a group of the heat exchanger fins 12 while passing through the first space 10a. The air that has passed through the first heat exchange enters the second space 10b through the communication port 42, and is then subjected to second heat exchange with another group of the heat exchanger fins 12 while passing through the second space 10b. In response to the operation of the first and second dampers 18a and 18b, air that is completely cooled or heated is selectively ejected to the first air vent 16a and the second air vent 16b. Since double heat exchange as above is possible, the efficiency of cooling and heating is increased.

In the case in which the air conditioner of an electric vehicle is intended to perform single heat exchange, as shown in FIG. 6, the partition damper 41 is rotated to close the entrance 17 of the air vent 16, and the blower 31 is operated in this state, so that part of intake air is introduced into the first space 10a and the remaining part of the intake air is introduced into the second space 10b through a space, which is opened by the rotation of the partition damper 41. The air introduced into the first space 10a and the second space 10b is subjected to heat exchange while passing through respective groups of the heat exchanger fins 12. After the completion of heat exchange, the air is ejected to the third air vent 16c through the third dampers 18c that are opened.

In addition, in the case in which the air conditioner of an electric vehicle is intended to perform both single heat exchange and double heat exchange at the same time, as shown in FIG. 7, the partition damper 41 is located in the middle between the position in which single heat exchange is performed and the position in which double heat exchange is performed, only one of the two third dampers 18c, which is closer to the second space 10b, is operated to open. When the blower 31 is operated in this state, part of air that is introduced through the inlet 15 is introduced into the first space 10a, and the remaining part of the air is introduced into the second space 10b through a space, which is opened by the rotation of the partition damper 41. The air that is introduced in the first space 10a is subjected to heat exchange with the heat dissipation fins 12, which are disposed inside the first space 10a, and passes through the communication port 42. Part of the air, which has passed through the communication port 42 and has been subjected to heat exchange, and the air, which is introduced into the second space 10b and has been subjected to heat exchange with the heat exchanger fins 12 inside the second space 10b, passes through the opened third damper 18c and is ejected to the third air vent 16c, and the remaining part of the air is ejected to the air vent 16 through the opened entrance 17. In response to the operation of the first and second dampers 18a and 18b, the air that is completely cooled or heated is selectively ejected to the first air vent 16a and the second air vent 16b.

As described above, the air conditioner of an electric vehicle of various embodiments is mounted in the position of the HVAC system of the related art, and is configured such that the two rows of the Peltier devices 11 are arranged and the partition 40 is disposed inside the Peltier unit 10. Due to this configuration, double heat exchange can be realized. Therefore, since double heat transfer can be realized by the two rows of the Peltier devices 11 that oppose each other, the efficiency of cooling and heating is increased due to an increase in the area of heat transfer and the improved air flow.

The blower 31 and the exhaust blower 21 are provided inside the engine room, thereby reducing noise and vibration, which occur during the blowing of air, from being transferred to the driver and the passengers inside the vehicle.

For convenience in explanation and accurate definition in the appended claims, the terms upper or lower, front or rear, inside or outside, and etc. are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. An air conditioner of an electric vehicle, comprising:
   a blower unit including a blower therein to forcibly blow intake air;
   a Peltier unit, wherein the Peltier unit is connected to the blower unit to receive air blown from the blower unit, and wherein the Peltier unit includes:
   a plurality of Peltier devices mounted on opposite side sections along an outer circumference thereof, with one surface of each of the Peltier devices being oriented inward and an other surface of each of the Peltier devices being oriented outward to eject air that is cooled or heated to a windshield and a passenger compartment of the vehicle;

heat exchanger fins mounted on one surface of each of the Peltier devices enabling heat transfer; and heat dissipation fins mounted on the other surface of each of the Peltier devices enabling heat transfer;

a partition mounted between the opposite side sections of the Peltier unit to divide a space inside the Peltier unit into first and second spaces, and separating a Peltier device mounted on one side section being contained in the first space from a Peltier device mounted on the other side section being contained in the second space, wherein the partition comprises:

a partition damper mounted on one end of the partition that faces an upper section of the Peltier unit and selectively allowing the first space and the second space of the Peltier unit to communicate with each other; and a communication port formed on the other end of the partition and allowing the first space and the second space of the Peltier unit to communicate with each other, wherein the partition damper and the communication port are configured such that when the partition damper is closed, the intake air sequentially passes through the first space to exchange heat with the Peltier device mounted in the first space, through the communication port and then through the second space to exchange heat with the Peltier device mounted in the second space, thereby facilitating the intake air to have double heat exchanges with the Peltier unit; and a guide case, wherein the guide case contains the Peltier unit therein and introduces outside air to dissipate heat to an outside, the heat being generated from the other surface of each of the Peltier devices, wherein the guide case comprises:

an exhaust inlet passage, wherein one end of the exhaust inlet passage contains therein an additional exhaust blower to take in air from an outside, and the other end of the exhaust inlet passage is connected to one of opposite side sections on which the Peltier devices are not mounted; and an exhaust outlet passage, wherein one end of the exhaust outlet passage is connected to the other side section opposite to one side section to which the exhaust inlet passage is connected such that the Peltier devices are disposed between the exhaust inlet passage and exhaust outlet passage, to exhaust air that has passed through heat exchange to the outside.

2. The air conditioner according to claim 1, wherein the Peltier unit comprises:

an upper section defining an inlet for allowing the blower unit to communicate with the first space and an entrance communicating with the second space, wherein the entrance communicates with an air vent, which guides air that has passed through heat exchange to the windshield and the passenger compartment of the vehicle; and the opposite side sections of four side sections, which adjoin the upper section, the Peltier devices being mounted on the opposite side sections.

3. The air conditioner according to claim 2, wherein the air vent comprises:

a first air vent guiding the cooled or heated air to be ejected toward the windshield of the vehicle; and a second air vent guiding the cooled or heated air to be ejected toward a chest of a driver or a passenger.

4. The air conditioner according to claim 3, wherein the Peltier unit further comprises a lower section opposite to the upper section, wherein the lower section communicates with a third air vent, which guides the cooled or heated air toward feet of the driver or the passenger.

5. The air conditioner according to claim 4, wherein a first damper is provided in an entrance of the first air vent, a second damper is provided in an entrance of the second air vent, and a third damper is provided in an entrance of the third air vent.

6. The air conditioner according to claim 1, wherein the exhaust blower is located in an engine room side with respect to a dash panel, which separates a cabin of the vehicle from the engine.

7. The air conditioner according to claim 1, wherein the blower unit is located in an engine room side with respect to a dash panel, which separates a cabin of the vehicle from the engine.

* * * * *